(12) United States Patent
Ishii et al.

(10) Patent No.: US 9,636,853 B2
(45) Date of Patent: May 2, 2017

(54) MOLDED BODY, METHOD OF MANUFACTURING THE SAME, SEAT MATERIAL FOR VEHICLES, AND METHOD OF MANUFACTURING THE SAME

(71) Applicant: HONDA MOTOR CO., LTD., Tokyo (JP)

(72) Inventors: Naoto Ishii, Wako (JP); Hisato Oku, Wako (JP); Mai Koizumi, Wako (JP); Akira Nakajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 14/499,593

(22) Filed: Sep. 29, 2014

(65) Prior Publication Data

US 2015/0093546 A1   Apr. 2, 2015

(30) Foreign Application Priority Data

Sep. 30, 2013   (JP) .................. 2013-203434
Nov. 19, 2013   (JP) .................. 2013-238606

(51) Int. Cl.
*B60N 2/70*   (2006.01)
*B29C 44/12*   (2006.01)
(Continued)

(52) U.S. Cl.
CPC ...... *B29C 44/1214* (2013.01); *B29C 44/0469* (2013.01); *B29C 44/0476* (2013.01);
(Continued)

(58) Field of Classification Search
CPC ..... Y10T 428/24496; Y10T 428/24521; A47C 7/18; B29C 44/0469; B29C 44/06;
(Continued)

(56) References Cited

FOREIGN PATENT DOCUMENTS

DE     1908604 A1 *  8/1970  .............. A47C 7/18
JP     61-160241 A   7/1986
(Continued)

OTHER PUBLICATIONS

English translation of WO 2004/034853.*
(Continued)

*Primary Examiner* — Catherine A Simone
(74) *Attorney, Agent, or Firm* — Westerman, Hattori, Daniels & Adrian, LLP

(57) ABSTRACT

There is provided a molded body including a main portion and a bank portion each of which is formed by foaming and molding a foam material. The main portion is made of urethane material which is softer than the material for the bank portion. At a boundary portion between the main and bank portions, the main portion is formed in a continuous interlocking profile and the bank portion is also formed in another continuous interlocking profile. The interlocking profile and the another interlocking profile are mated to each other so as to prevent separation between the main portion and the bank portion in a direction of an arrow (vehicle width direction). The boundary portion is provided by partitioning the cavity in a single mold with a weir, introducing different foam materials into both sides of the weir and foaming the introduced materials.

5 Claims, 13 Drawing Sheets

(51) Int. Cl.
  *B29C 44/34* (2006.01)
  *B29C 44/04* (2006.01)
  B29K 75/00 (2006.01)
  B29K 105/04 (2006.01)
  B29L 31/00 (2006.01)

(52) U.S. Cl.
  CPC .......... *B29C 44/353* (2013.01); *B60N 2/7017* (2013.01); *B29K 2075/00* (2013.01); *B29K 2105/04* (2013.01); *B29L 2031/771* (2013.01); *Y10T 428/24496* (2015.01)

(58) Field of Classification Search
  CPC ... B29C 44/08; B29C 44/1214; B29C 44/353; B29C 44/086; B60N 2/7017; B60N 2/7035; B29L 2031/771; B29L 2031/751; B29L 2031/58
  See application file for complete search history.

(56) References Cited

FOREIGN PATENT DOCUMENTS

| JP | 04-025415 A | 1/1992 | |
|---|---|---|---|
| JP | 6-42128 U | 6/1994 | |
| JP | 6-86697 U | 12/1994 | |
| JP | WO 2004034853 A1 * | 4/2004 | ............... A47C 7/18 |
| JP | 2008-132254 A | 6/2008 | |
| JP | 2012-61092 A | 3/2012 | |

OTHER PUBLICATIONS

Translation of DE1908604; published Aug. 13, 1970.*
Notification of Reasons for Rejection dated Jun. 30, 2015, issued in counterpart Japanese Patent Application No. 2013-238606 (3 pages).

* cited by examiner

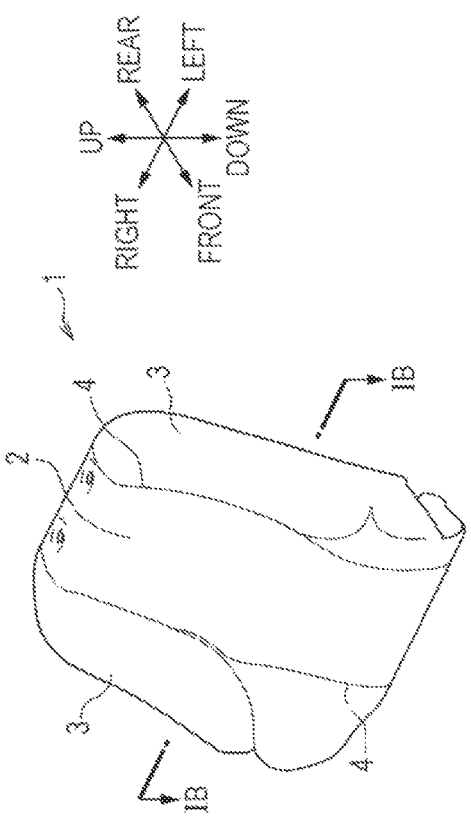
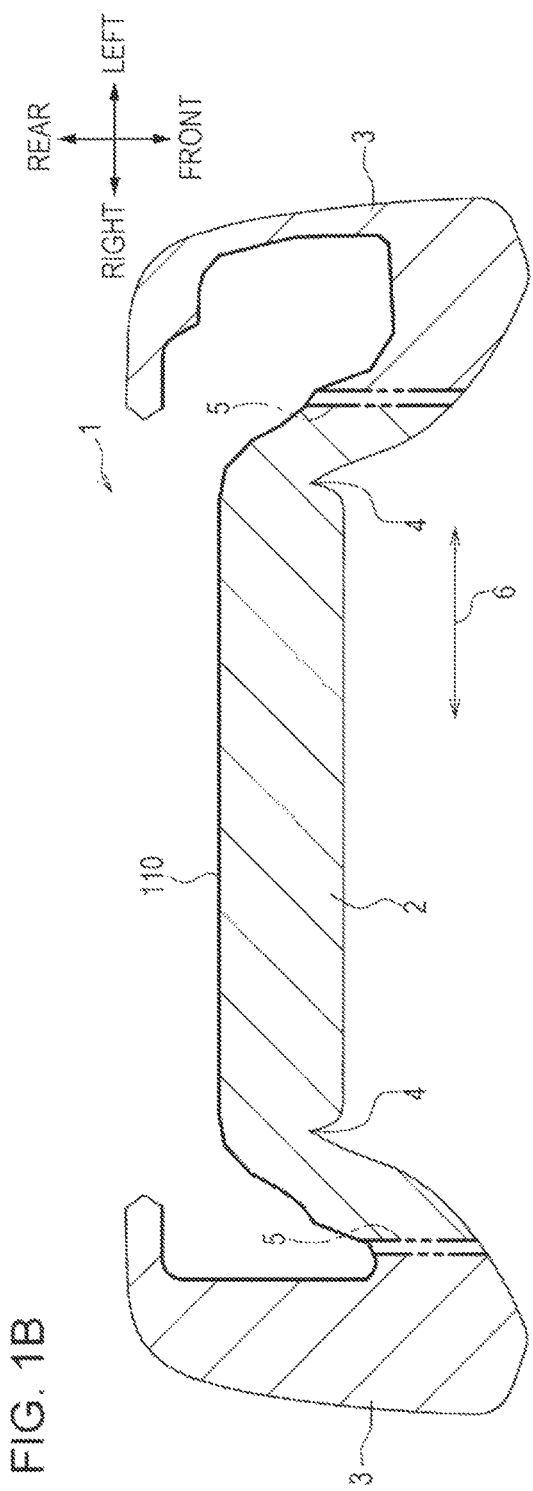
FIG. 1A
FIG. 1B

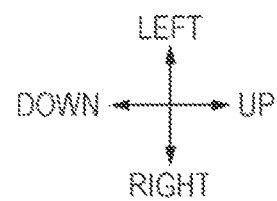
FIG. 2A
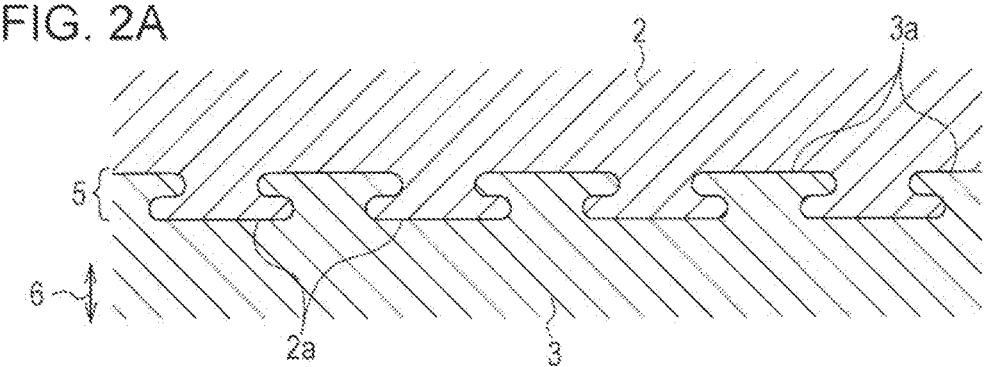
FIG. 2B
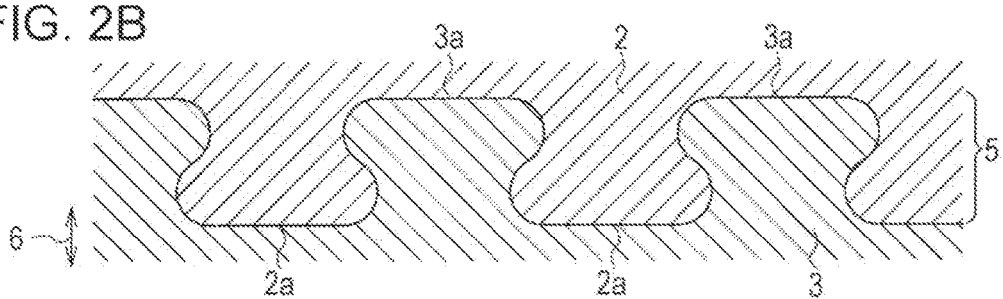
FIG. 2C
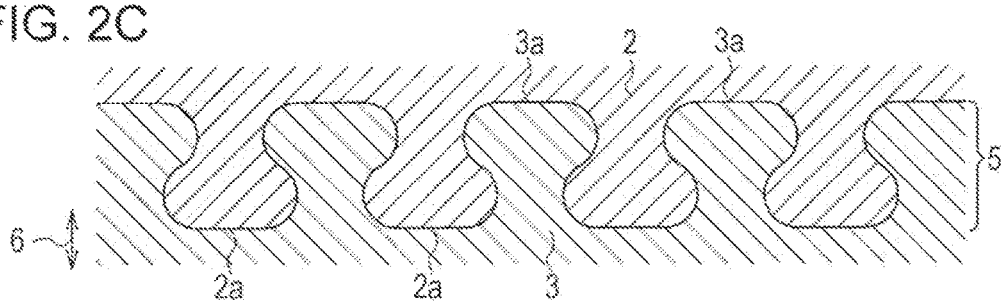
FIG. 2D
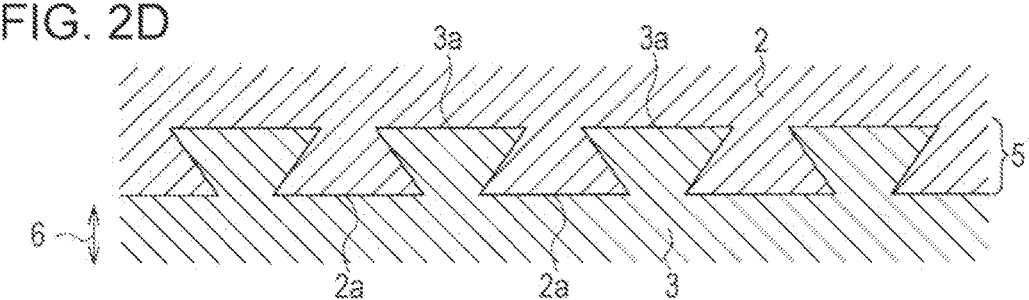

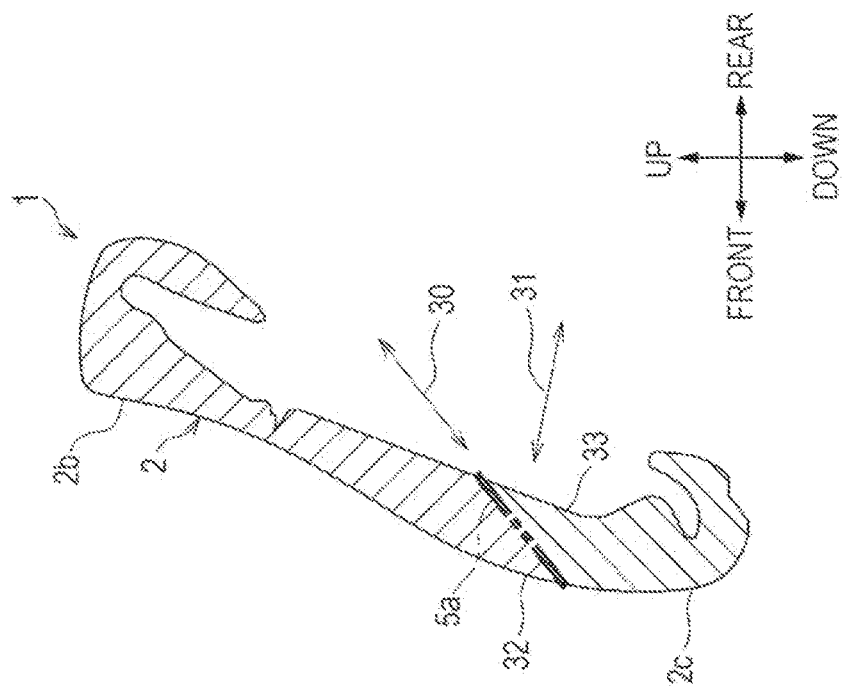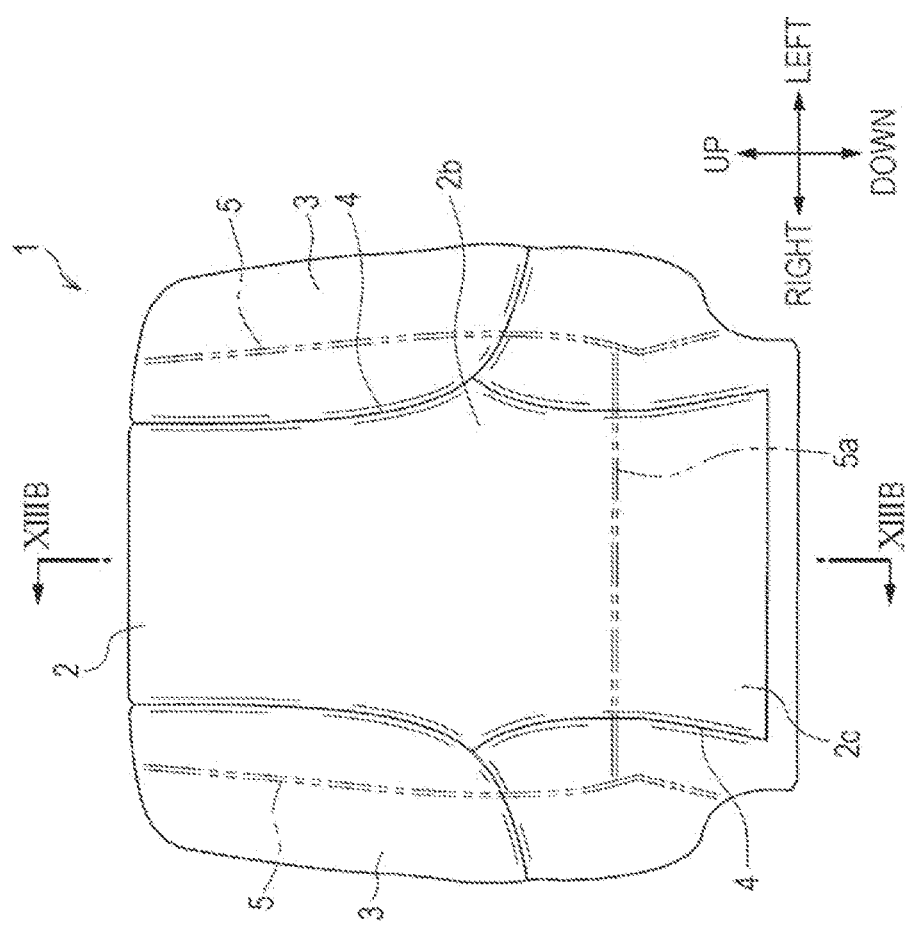

MOLDED BODY, METHOD OF MANUFACTURING THE SAME, SEAT MATERIAL FOR VEHICLES, AND METHOD OF MANUFACTURING THE SAME

CROSS REFERENCES TO RELATED APPLICATIONS

The present application claims priority under 35 U.S.C. §119 to Japanese Patent Application No. 2013-203434, filed Sep. 30, 2013, entitled "Molded Body, Method of Manufacturing The Same, Seat Material for Vehicles, And Method of Manufacturing The Same" and Japanese Patent Application No. 2013-238606, filed Nov. 19, 2013, entitled "Molded Body, Method of Manufacturing The Same, Seat Material for Vehicles, And Method of Manufacturing The Same." The contents of these applications are incorporated herein by reference in their entirety.

TECHNICAL FIELD

The present disclosure relates to a molded body, a method of manufacturing the molded body, a seat material for vehicles, and a method of manufacturing the seat material for vehicles.

BACKGROUND

A seat back pad and a seat cushion pad, each of which serves as a material of a seat for vehicles, are manufactured by foaming and molding a foam material such as urethane. Such seat material includes a relatively soft main portion and a relatively hard bank portion which is provided on each of both sides of the main portion. In this manner, the main portion and the bank portion have different hardness levels and are formed with foam materials having different hardness levels after foaming. As a technology for manufacturing a seat material including the main portion and the bank portion having different hardness levels like this, Japanese Unexamined Patent Application Publication (JP-A) No. 4-25415, Japanese Unexamined Patent Application Publication (JP-A) No. 61-160241, and Japanese Unexamined Patent Application Publication (JP-A) No. 2008-132254 are known.

JP-A No. 4-25415 and JP-A No. 61-160241 each disclose a technology in which urethane material is first spray-coated in a mold and is foamed, subsequently, urethane material of a different type is poured into the same mold, and both materials are integrated. JP-A No. 2008-132254 discloses a technology in which a thin partition wall partitions a cavity in a mold, an undiluted solution of urethane foam having a low hardness is poured inside the thin partition wall to form a pad main body and an inner support portion, and an undiluted solution of urethane foam having a high hardness is poured outside the thin partition wall to form an outer support portion.

However, the technology of JP-A No. 4-25415 and JP-A No. 61-160241 provides no solution for positioning two types of urethane materials in the mold, and thus the two types of urethane materials are not foamed at respective desired positions and one of the urethane materials is poured to a position at which the other of the urethane materials is intended to be foamed. That is, there is a problem in that it is difficult to cause a desired urethane material to be foamed at a desired position.

With the technology of JP-A No. 2008-132254, the thin partition wall serves as a weir for the undiluted solution of urethane foam, and thus the undiluted solution of urethane foam having a high hardness will not be foamed at a position where the undiluted solution of urethane foam having a low hardness is supposed to be foamed nor vice versa. However, because the thin partition wall also serves as part of the mold, a release agent is coated on the thin partition wall. For this reason, a product after molding has a problem in that the boundary portion between the urethane foam having a low hardness and the urethane foam having a high hardness may not be sufficiently bonded to each other and thus the bonding strength is low. The present disclosure provides a molded body (seat material for vehicles) and a method of manufacturing the molded body, the method allowing different foam materials to be appropriately foamed at respective predetermined positions, the molded body having a high bonding strength between a first molded object (main portion) and a second molded object (bank portion).

SUMMARY

An aspect of the present disclosure provides a molded body including: a first molded object which is molded with a foam material; and a second molded object which is molded with a foam material different from the foam material of the first molded object, wherein the first molded object and the second molded object are mated to each other in respective interlocking profiles at a boundary portion between the molded objects to prevent mutual separation of the molded objects. Accordingly, it is possible to manufacture the first molded object and the second molded object by appropriately foaming and molding different foam materials on opposite sides of a weir at respective predetermined positions. Due to the geometry of the weir, the first molded object and the second molded object may be molded to be mated to each other in respective interlocking profiles at the boundary portion between the first and second molded objects to allow mutual separation to be prevented. Moreover, it is possible to provide a molded body (seat material for vehicles) and a method of manufacturing the molded body, the method allowing different foam materials to be appropriately foamed at respective predetermined positions, the molded body allowing separation between the first molded object (main portion) and the second molded object (bank portion) to be prevented.

Another aspect of the present disclosure provides a method of manufacturing a molded body, the method including: preparing a mold for molding, the mold having a cavity in which a weir that dams a foam material is provided; introducing a first foam material and a second foam material on opposite sides of the weir in the cavity after the preparing of the mold, the first and second foam materials being different from each other; foaming the first foam material and the second foam material in the cavity after the introducing of the first and second foam materials; and removing the weir from the first foam material and the second foam material during or subsequent to the foaming of the first and second foam materials, wherein in the foaming of the first and second foam materials, the weir molds the first foam material and the second foam material on opposite sides of the weir into a first molded object and a second molded object, respectively, wherein the first molded object and the second molded object are interlocked to each other by means of respective interlocking profiles at a boundary portion between the first and second molded objects to prevent mutual separation of the first and second molded objects. Accordingly, it is possible to prevent the first foam material from flowing into a position to be foamed, at which the second foam material is supposed to be foamed and to prevent the second foam material from flowing into a position to be foamed, at which the first foam material is supposed to be foamed. The first foam material and the second foam material may be mated to each other in respective interlocking profiles at the boundary portion between the foam materials so as to allow mutual separation to be prevented.

In this case, in the preparing of the mold for molding, a height of the weir may be greater than or equal to ½ a gap in a direction of the height of an area of the cavity, the area being provided with the weir. Accordingly, it is possible to appropriately prevent the first foam material from flowing into a position to be foamed, at which the second foam material is supposed to be foamed and to appropriately prevent the second foam material from flowing into a position to be foamed, at which the first foam material is supposed to be foamed.

Another aspect of the present disclosure provides a seat material for vehicles, including: a main portion molded with a foam material; and a bank portion which is provided on each of both sides of the main portion and molded with a foam material different from the foam material of the main portion, wherein the main portion and the bank portion are mated to each other in respective interlocking profiles at a boundary portion between the main and bank portions to prevent mutual separation of the main and bank portions. Accordingly, it is possible to manufacture the main portion and the bank portion by appropriately foaming and molding different foam materials on opposite sides of the weir at respective predetermined positions. Due to the geometry of the weir, the main portion and the bank portion may be molded to be mated to each other in respective interlocking profiles at the boundary portion between the main and bank portions to allow mutual separation to be prevented.

In this case, the main portion may be divided into a first member on an upper side or a forward side of a vehicle and a second member on a lower side or a rear side of the vehicle, the second member being molded with a foam material different from the foam material of the first member, and the members may be mated to each other in respective interlocking profiles at a boundary portion between the members to prevent mutual separation of the members. Accordingly, it is possible to manufacture the first member and the second member by appropriately foaming and molding different foam materials on opposite sides of the weir at respective predetermined positions. Due to the geometry of the weir, the first member and the second member may be molded to be mated to each other in respective interlocking profiles at the boundary portion between the first and second members to allow mutual separation to be prevented.

In this case, the second member may be molded with a foam material having a hardness after foaming higher than a hardness of the first member. Accordingly, the second member may fully support the waist of a passenger, the first member may absorb the vibration of the vehicle, and transmission of the vibration to the shoulder of a passenger may be reduced.

In this case, a width direction of the boundary portion may form an acute angle with respect to a thickness direction of the first member and the second member. Accordingly, it is possible to provide a comfortable seat for vehicles by preventing a passenger from feeling a clear boundary portion between the first member and the second member.

Another aspect of the present disclosure provides a method of manufacturing a seat material for vehicles, the method including: preparing a mold for molding, the mold having a cavity in which a weir that dams a foam material is provided; introducing a first foam material and a second foam material on both sides of the weir in the cavity after the preparing of the mold; foaming the first foam material and the second foam material in the cavity after the introducing of the first and second foam materials, the second foam material having a hardness after foaming higher than a hardness of the first foam material; and removing the weir from the first foam material and the second foam material during or subsequent to the foaming of the first and second foam materials, wherein in the foaming of the first and second foam materials, the weir molds the first foam material and the second foam material on opposite sides of the weir into a main portion and a bank portion, respectively, wherein the main portion and the bank portion are interlocked to each other by means of respective interlocking profiles at a boundary portion between the main and bank portions to prevent mutual separation of the main and bank portions. Accordingly, it is possible to prevent the first foam material from flowing into a position to be foamed, at which the second foam material is supposed to be foamed and to prevent the second foam material from flowing into a position to be foamed, at which the first foam material is supposed to be foamed. The main portion molded with first foam material and the bank portion molded with the second foam material may be mated to each other in respective interlocking profiles at the boundary portion between the main and bank portions so as to allow mutual separation to be prevented.

BRIEF DESCRIPTION OF THE DRAWINGS

The advantages of the disclosure will become apparent in the following description taken in conjunction with the following drawings.

FIGS. 1A and 1B are each an explanatory diagram of a seat material for vehicles according to an embodiment of the present disclosure, FIG. 1A is a perspective view of the seat material, and FIG. 1B is an enlarged cross-sectional view thereof taken along line IB-IB.

FIGS. 2A to 2D are each an enlarged cross-sectional view of the boundary portion between a main portion and a bank portion of the seat material for vehicles according to the embodiment of the present disclosure, and FIGS. 2A to 2D illustrate different examples.

FIG. 4A is a perspective view of the weir, and FIG. 4B is a top view of the weir.

FIGS. 5A to 5C illustrate different examples.

FIG. 12A is a plan view of the seat material, FIGS. 12B and 12C illustrate respective different examples of cross-sectional views taken along line XIIB-XIIB or line XIIC-XIIC of FIG. 12A.

FIGS. 13A and 13B are each an explanatory diagram illustrating a modification of the seat material for vehicles according to an embodiment of the present disclosure, FIG. 13A is a plan view of the modification, and FIG. 13B is a cross-sectional view of the modification taken along line XIIIB-XIIIB of FIG. 13A.

DETAILED DESCRIPTION

Figure 3:
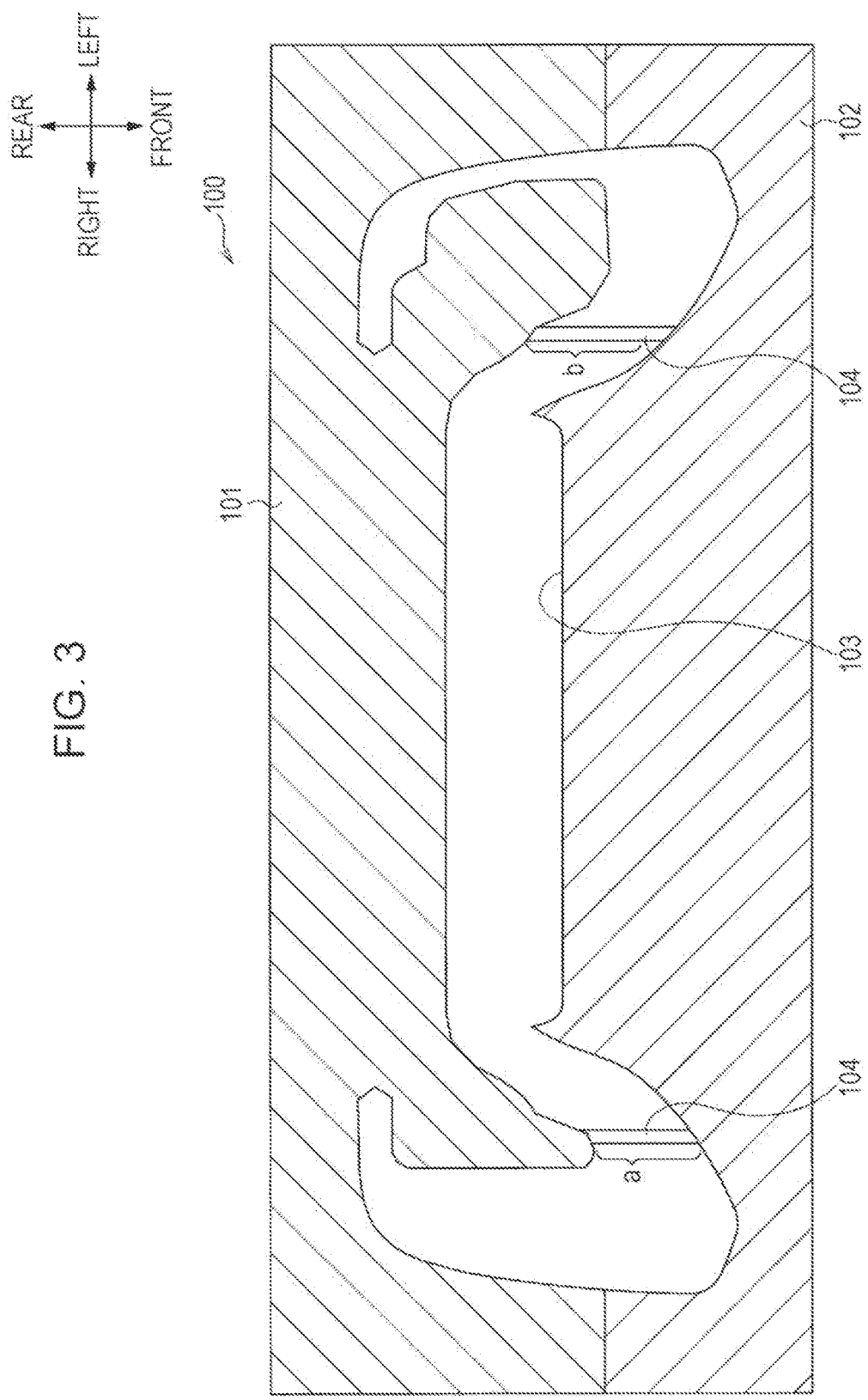
FIG. 3 is a vertical cross-sectional view of a mold which is used in a method of manufacturing the seat material for vehicles according to an embodiment of the present disclosure.

Hereinafter, an embodiment of the present disclosure will be described.

(Structure of Seat Material for Vehicles)

First, the structure of a seat material for vehicles according to the present embodiment will be described. FIG. 1A is a perspective view of a seat material 1 for vehicles, and FIG. 1B is an enlarged cross-sectional view of the seat material 1 for vehicles taken along line IB-IB. FIGS. 1A and 1B and the other figures illustrate the directions with respect to a vehicle on which the seat material 1 for vehicles is mounted, as necessary. The seat material 1 (molded body) for vehicles is a seat back pad that forms a seat for vehicles. That is, the seat material 1 for vehicles serves as the seat back of a seat for vehicles when covered with an outer layer material such as leather or cloth. The seat material 1 for vehicles includes a main portion 2 (first molded object) which forms the central portion in a vehicle width direction, and bank portions 3 (second molded objects) which form both side portions of the main portion 2 in the vehicle width direction. Grooves 4, which extend in an upper/lower direction of the vehicle, are formed between the main portion 2 and the bank portions 3. The grooves 4 each serve as a groove for design at which a stitch of the outer layer material is located.

The main portion 2 and the bank portions 3 are each formed by foaming and molding a foam material (urethane material). The main portion 2 is made of urethane material which is softer than the material for the bank portions 3. This is because the back of a passenger is pressed down against and made to have intimate contact with the vehicular forward side of the main portion 2. On the other hand, the bank portions 3 are made of urethane material which is harder than the material for the main portion 2. This is because the bank portions 3 are designed to firmly receive the body of a passenger when a lateral acceleration is applied to the passenger. In this manner, the main portion 2 and the bank portions 3 are molded with different foam materials and have different levels of hardness. Also, the back of the seat material 1 for vehicles is provided with a non-woven fabric 110.

FIGS. 2A to 2D are each an enlarged cross-sectional view of a boundary portion 5 between the main portion 2 and each bank portion 3, and FIGS. 2A to 2D illustrate various examples of the boundary portion 5. In each of the examples, at the boundary portion 5, the main portion 2 is formed in a continuous interlocking profile 2a and the bank portion 3 is also formed in a continuous interlocking profile 3a. The interlocking profile 2a and the interlocking profile 3a are mated to each other so as to provide a structure that prevents separation between the main portion 2 and the bank portion 3 in a direction of arrow 6 (vehicle width direction). It is to be noted that the boundary portion 5 between the main portion 2 and the bank portion 3 may be set at various positions of the seat material 1 for vehicles other than the example of FIGS. 1A and 1B.

Each of the interlocking profiles 2a, 3a includes an end which projects to the right and left and a narrowed tail end, and such pattern continuously repeats. The ends of the interlocking profiles 2a, 3a are mated to each other to prevent mutual separation. For example, the interlocking profile includes alternately arranged bulbous projection and recess which corresponds to the bulbous projection. FIG. 2A illustrates an example of relatively small-sized interlocking profiles 2a, 3a, FIG. 2B illustrates an example of relatively large-sized interlocking profiles 2a, 3a, and FIG. 2C illustrates an example of interlocking profiles 2a, 3a having an intermediate size between the two. The interlocking profiles 2a, 3a in FIGS. 2A to 2C each have a round outer shape, but may have a trapezoidal shape as in FIG. 2D. For example, the interlocking profile includes alternately arranged dovetail projection and recess which corresponds to the dovetail projection.

(Method of Manufacturing Seat Material for Vehicles)

Figure 4A:
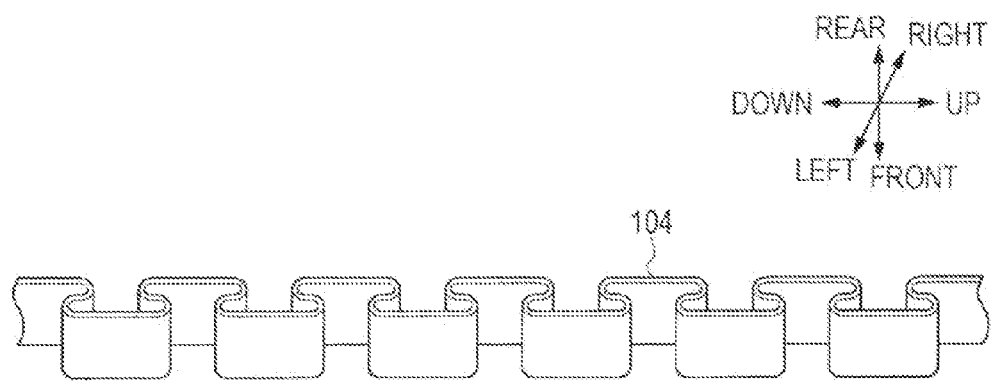
FIGS. 4A and 4B are each an explanatory diagram of a weir for a mold which is used in the method of manufacturing the seat material for vehicles according to the embodiment of the present disclosure.
Figure 4B:
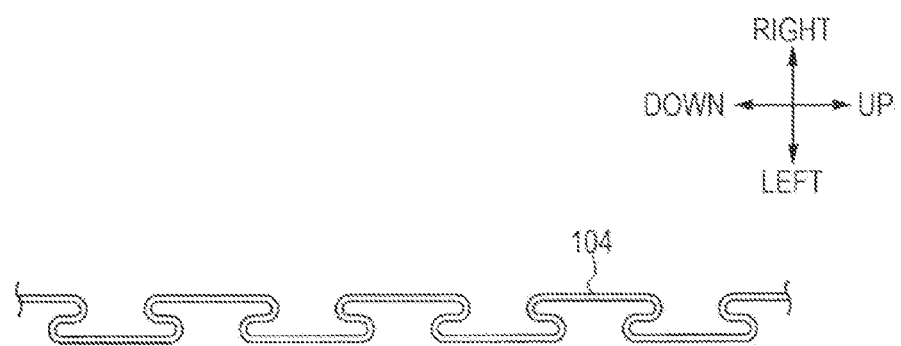
Figure 5A:
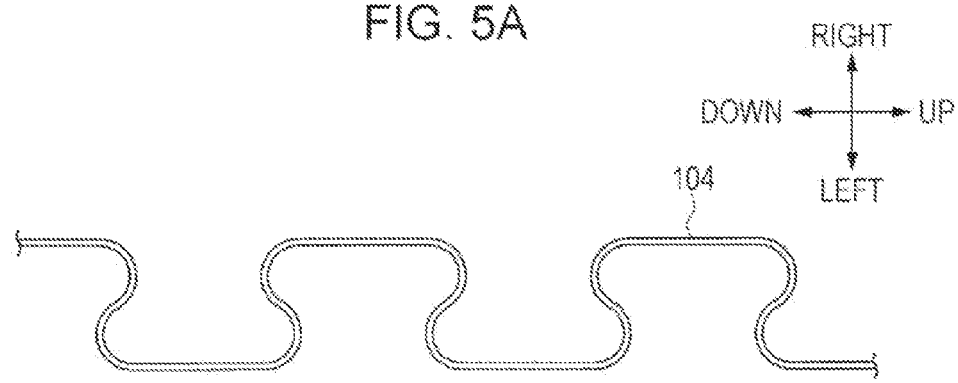
FIGS. 5A to 5C are each an explanatory diagram of the weir for the mold which is used in the method of manufacturing the seat material for vehicles according to the embodiment of the present disclosure.
Figure 5B:
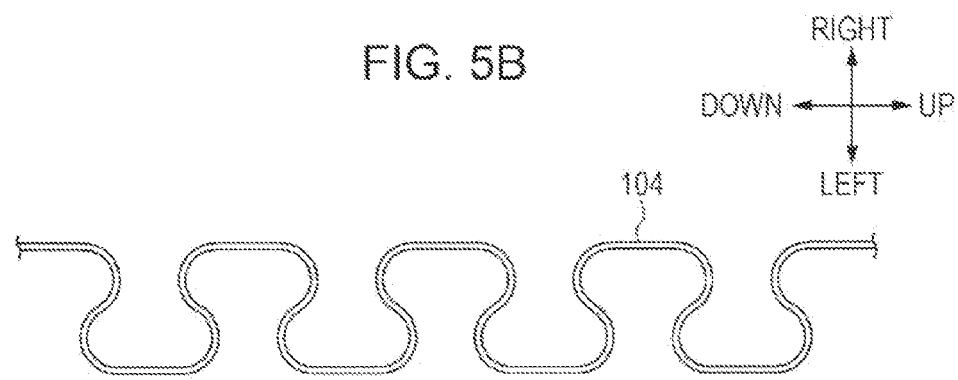
Figure 5C:
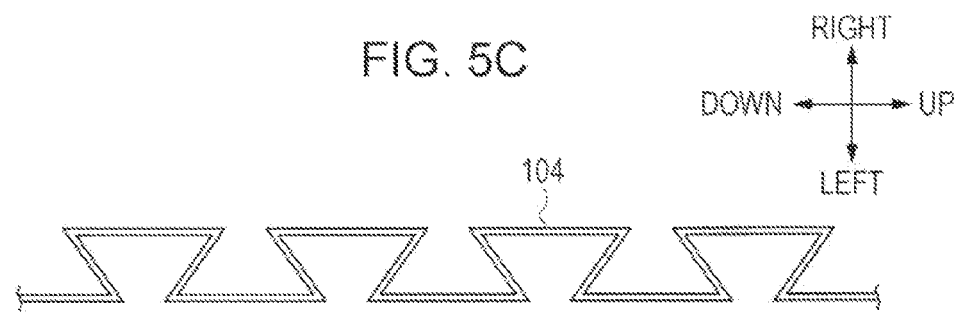

Next, a method of manufacturing the seat material 1 for vehicles having the above-mentioned configuration will be described. The seat material 1 for vehicles is formed by foaming and molding an undiluted solution of foam material (urethane material) in the mold. FIG. 3 is a vertical cross-sectional view of a mold 100. The mold 100 includes an upper mold 101 and a lower mold 102. On the lower mold 102 side in a cavity 103 between the upper mold 101 and the lower mold 102, there are provided weirs 104 at two positions, the weirs having a width direction in an upper/lower direction of the mold 100 (the upper direction is the rearward direction of the vehicle). FIGS. 4A and 4B are respectively a perspective view and a top view illustrating an example of each weir 104. The weir 104 dams the undiluted solution of foam material which is introduced in the mold 100, and serves as part of the mold 100 for molding the foam material to make the boundary portions 5. FIGS. 4A and 4B illustrate the weir 104 in the case where the boundary portion 5 of FIG. 2A is molded. FIGS. 5A to 5C illustrate the top views of the weirs 104 in the case where the boundary portions 5 of FIGS. 2B to 2D are molded, respectively.

Figure 6:
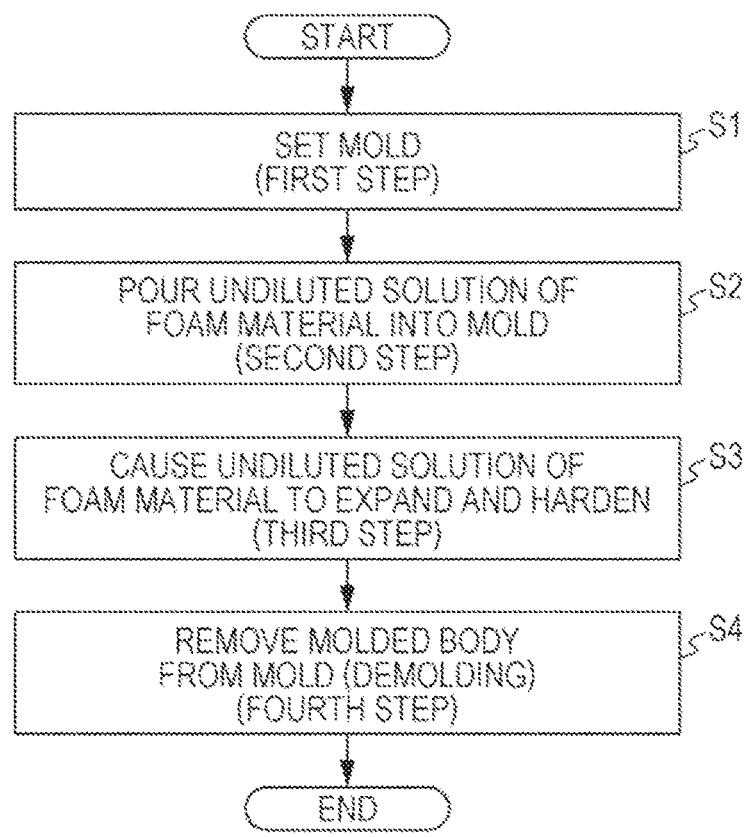
FIG. 6 is a flow chart illustrating the method of manufacturing the seat material for vehicles according to the embodiment of the present disclosure.

Next, a method of manufacturing the seat material 1 for vehicles will be described, the method using the mold 100 of FIG. 3. FIG. 6 is a flow chart sequentially illustrating the method of manufacturing the seat material 1 for vehicles. First, the mold 100 including the weir 104 described above with reference to FIG. 3, FIGS. 5A to 5C, at two positions is prepared (first step) (S1). The "preparation of the mold" in the present embodiment specifically indicates that the mold 100 is set at a predetermined position.

Figure 7:
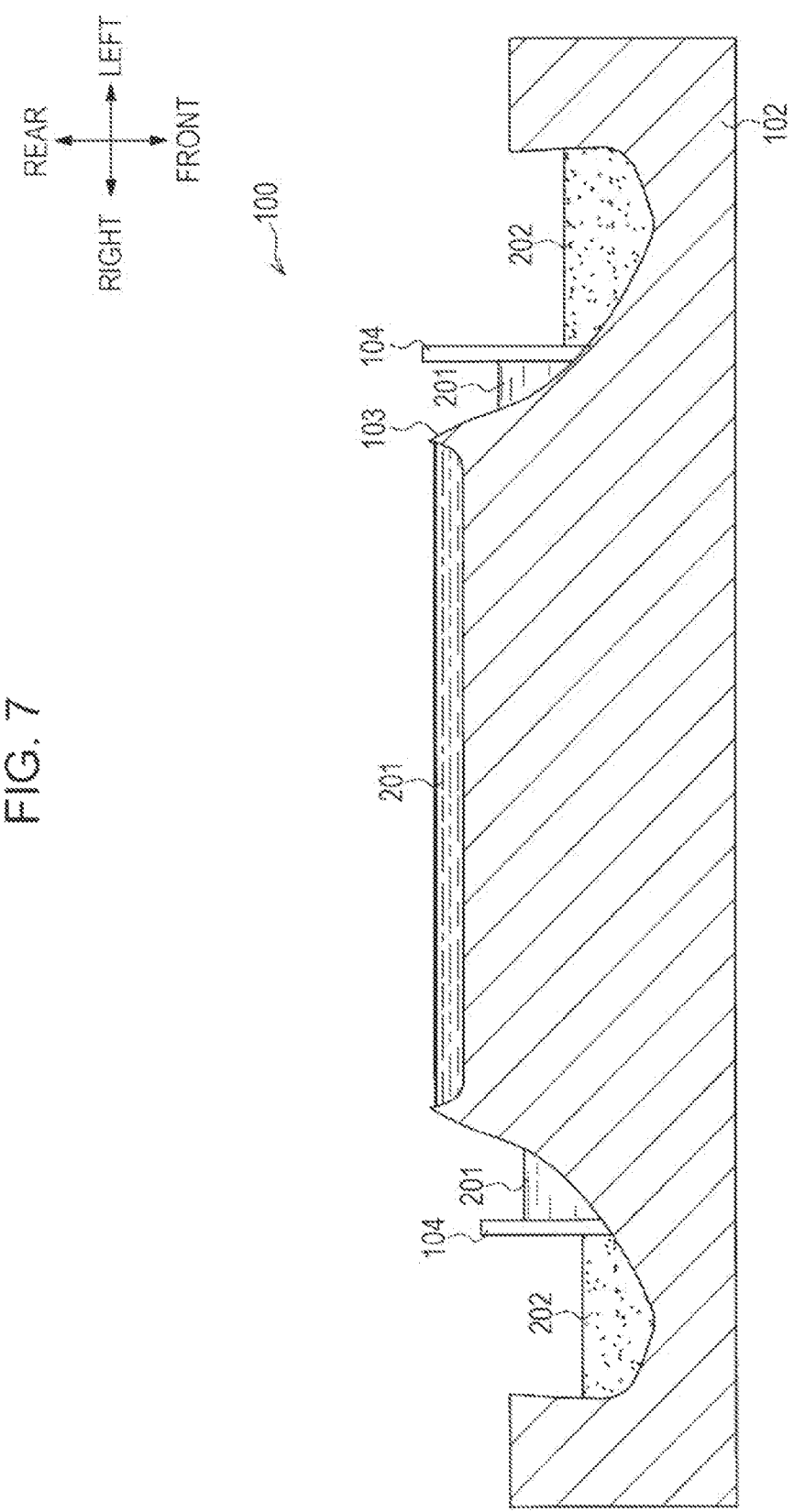
FIG. 7 is an explanatory diagram illustrating step S2 of the method of manufacturing the seat material for vehicles according to the embodiment of the present disclosure.

Next, as illustrated in FIG. 7, undiluted solution of mutually different foam materials is introduced at different positions of the lower mold 102 of the mold 100. That is, an undiluted solution of a foam material (first foam material) 201 is introduced into the space (the central portion of the vehicle in a right/left direction) between the two weirs 104 within the cavity 103 of the lower mold 102, the foam material after foaming turning into urethane material having a relatively low hardness. In addition, an undiluted solution of a foam material (second foam material) 202 is poured on both end sides of the weirs 104 in a right/left direction of the vehicle within the cavity 103 of the lower mold 102, the foam material after foaming turning into urethane material having a hardness higher than the hardness of the foam material 201 (second step) (S2). The amount of the undiluted solution of the foam materials 201, 202 to be poured is approximately ⅕ the volume of the space of the cavity 103. In other words, the undiluted solution of the foam materials 201, 202 foams and expands to 5 times in volume. The undiluted solution of the foam material 201 and the undiluted solution of the foam material 202, when introduced into the cavity 103, are dammed by the respective weirs 104 and not mixed with each other. It is preferable that the heights of the weirs 104 be greater than ½ the respective gaps a, b in the height direction of an area of the cavity 103, the area being provided with the weirs 104.

Figure 8:
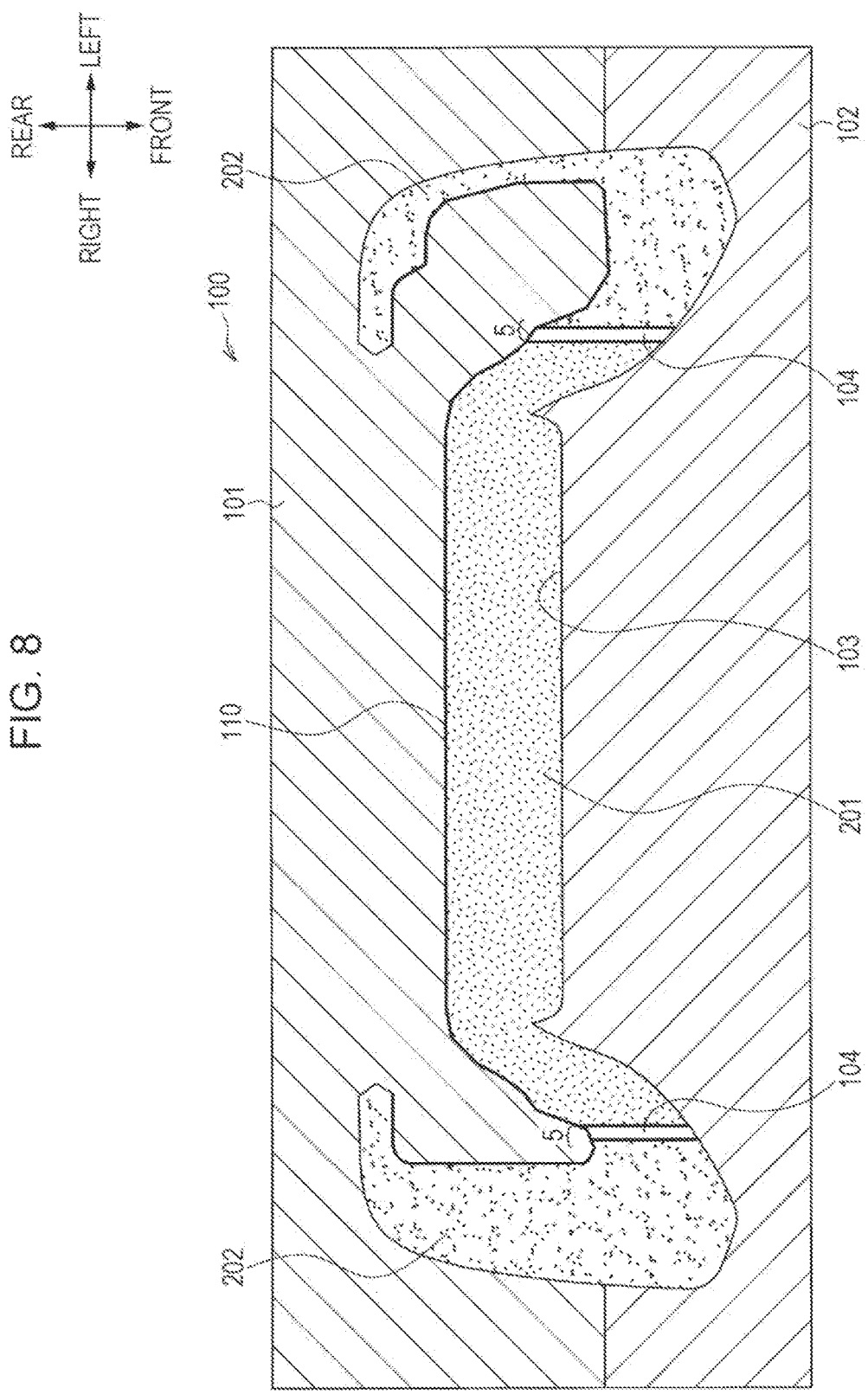
FIG. 8 is an explanatory diagram illustrating step S3 of the method of manufacturing the seat material for vehicles according to the embodiment of the present disclosure.

Next, the lower mold 102 is closed by the upper mold 101 (the state of FIG. 3), and the undiluted solution of the foam materials 201, 202 is heated by a heater (not illustrated) provided in the mold 100 so as to be foamed (third step) (S3). The non-woven fabric 110 is previously attached on the surface of the upper mold 101 that faces the cavity. This process causes the undiluted solution of the foam materials 201, 202 to be foamed, expanded, and hardened, and thus the undiluted solution is molded in the cavity 103. This state is illustrated in FIG. 8. In the above process, the foam material 201 and the foam material 202 are separated by the weirs 104 and molded with the weirs 104. Thus, the boundary portions 5 are formed at the weirs 104. That is, the main portion 2 and the bank portions 3 are molded in respective interlocking profiles 2a, 3a at the boundary portions 5 so that the interlocking profile 2a and the interlocking profile 3a are mated to each other, and thus mutual separation may be prevented.

Next, the molded body (urethane foam) molded in step S3 is removed (demolded) from the mold 100, that is, released from the mold (fourth step) (S4). Specifically, in FIG. 8, the upper mold 101 is released in a direction perpendicular to the paper surface of the drawing, and the lower mold 102 is released in the lower direction (the forward direction of the vehicle). In the above process, the weirs 104 are fixed to the lower mold 102, and thus when the lower mold 102 is released in the lower direction, the weirs 104 are removed from the foam materials 201, 202.

In this example, after the foaming process of the undiluted solution of the foam materials 201, 202 is completed, the weirs 104 are removed from the foam materials 201, 202. However, the weirs 104 may be removed from the foam materials 201, 202 during the foaming process of the undiluted solution of the foam materials 201, 202. In this case, the weirs 104 are removed even though the foaming process of the foam materials 201, 202 is not completed. Thus, it is preferable that the weirs 104 be removed when the foaming of the foam materials 201, 202 is completed and thus the foam material 201 and the foam material 202 are substantially not mixed with each other at both side portions of the weirs 104. By the above process, the seat material 1 for vehicles illustrated in FIGS. 1A and 1B may be manufactured.

Figure 9:
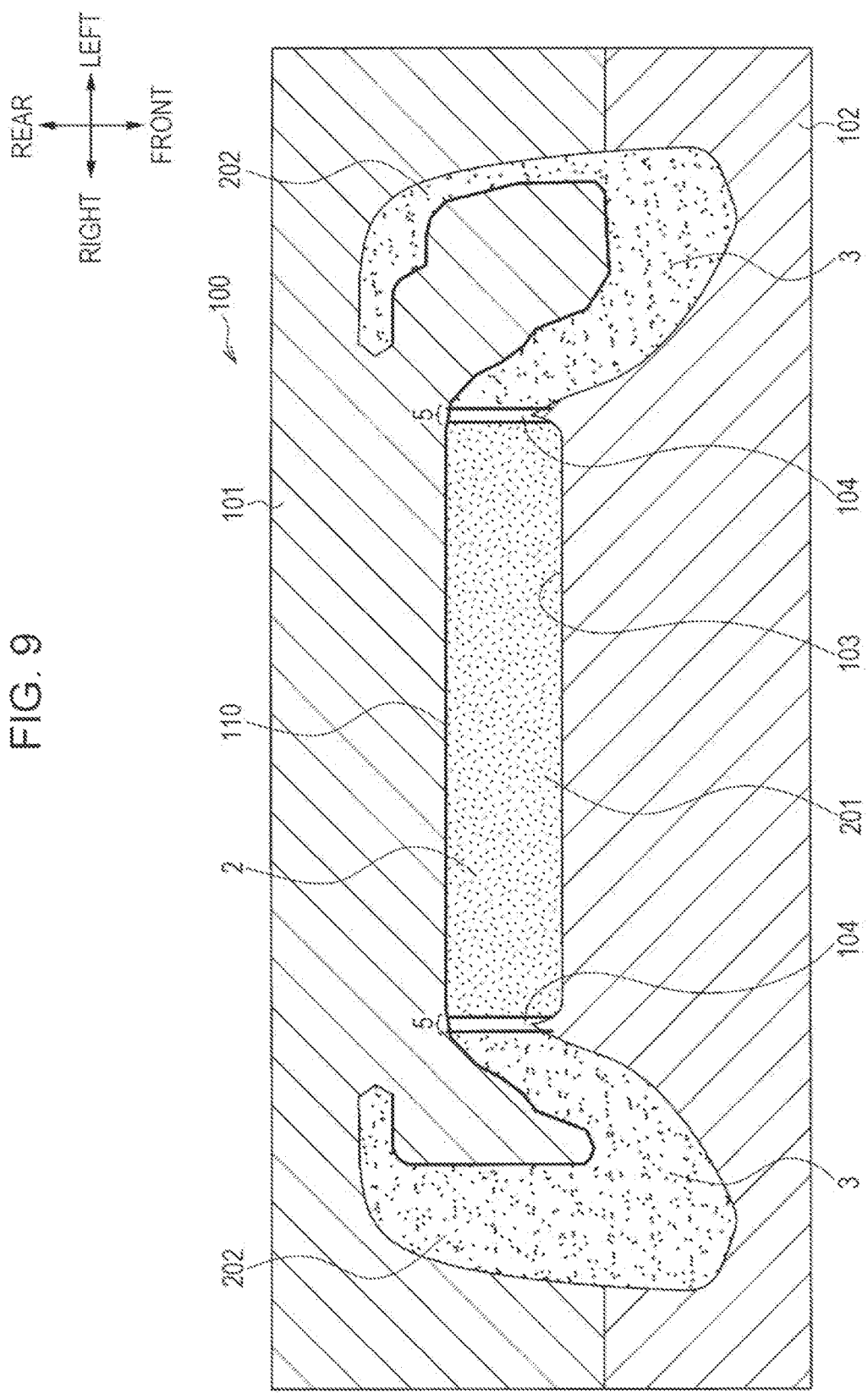
FIG. 9 is an explanatory diagram illustrating an example in which the position of the weir is changed in the method of manufacturing the seat material for vehicles according to the embodiment of the present disclosure.
Figure 10:
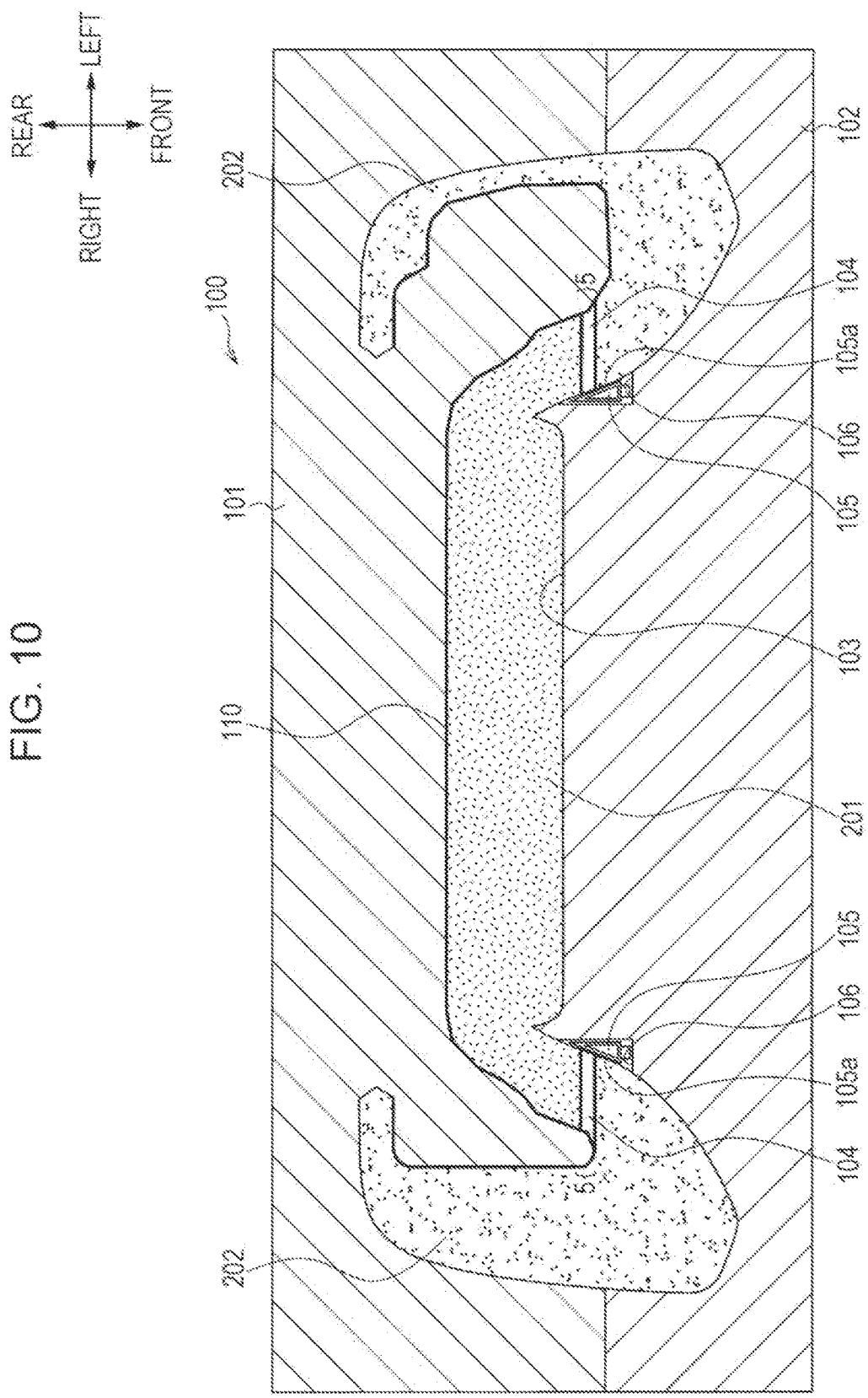
FIG. 10 is an explanatory diagram illustrating an example in which a magnet is attached to the weir in the method of manufacturing the seat material for vehicles according to the embodiment of the present disclosure.
Figure 11:
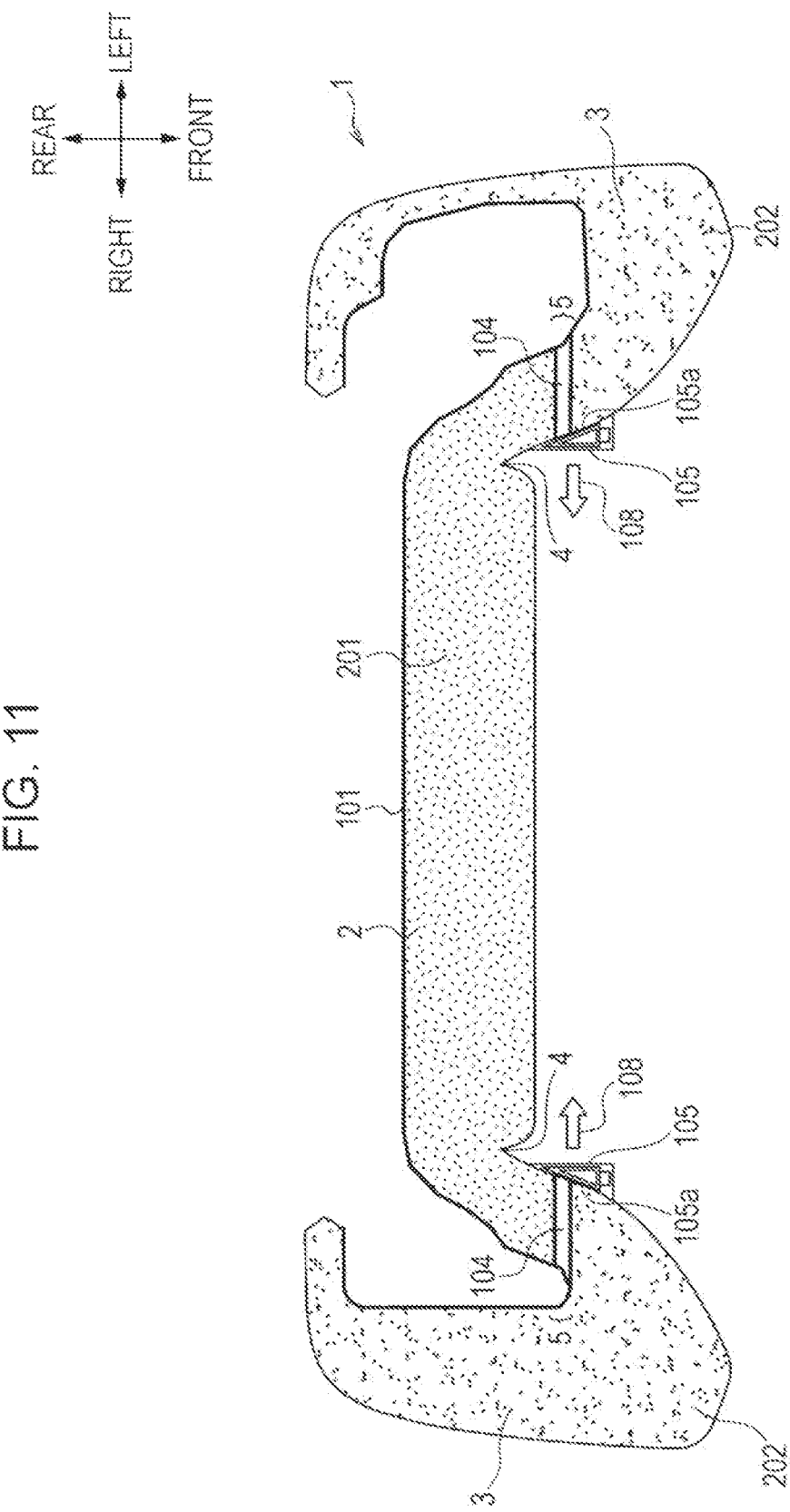
FIG. 11 is an explanatory diagram illustrating an example in which a magnet is attached to the weir in the method of manufacturing the seat material for vehicles according to the embodiment of the present disclosure.

It is to be noted that the position (the formation position of each boundary portion 5) of each weir 104 may be selected in various manners. For example, in contrast to the example of FIG. 8, the example of FIG. 9 illustrates the case where the weirs 104 (the formation positions of the boundary portions 5) are moved so that the region of the main portion 2 is reduced and the region of each bank portion 3 is expanded. As illustrated in FIG. 10, it may be possible that a magnet 105 is fixed to one side of each weir 104 in a plate width direction, the magnet 105 is fixed by its magnetic force to a recessed portion 106 formed in the lower mold 102, and thus the weir 104 is fixed to the lower mold 102. In this case, part 105a of the surface of the magnet 105 serves as part of the cavity 103. In this case, when the lower mold 102 is released in S4 described above, the magnet 105 is removed from the lower mold 102, and the seat material 1 for vehicles after the molding is taken out from the mold 100 with each weir 104 attached (the state of FIG. 11). Subsequently, the weirs 104 (and the magnets 105) may be pulled out in the direction of arrow 108 from the seat material 1 for vehicles after the molding. According to the example of FIG. 10, even when the plate width direction of the weir 104 is not the upper/lower direction (the forward/rearward direction of the vehicle) (in the example of FIG. 10 and FIG. 11, the plate width direction of the weir 104 is the horizontal direction (right/left direction of the vehicle)), that is, even when the mold release direction of the weir 104 does not match the mold release direction of the lower mold 102, mold release may be made easily.

Figure 12A:
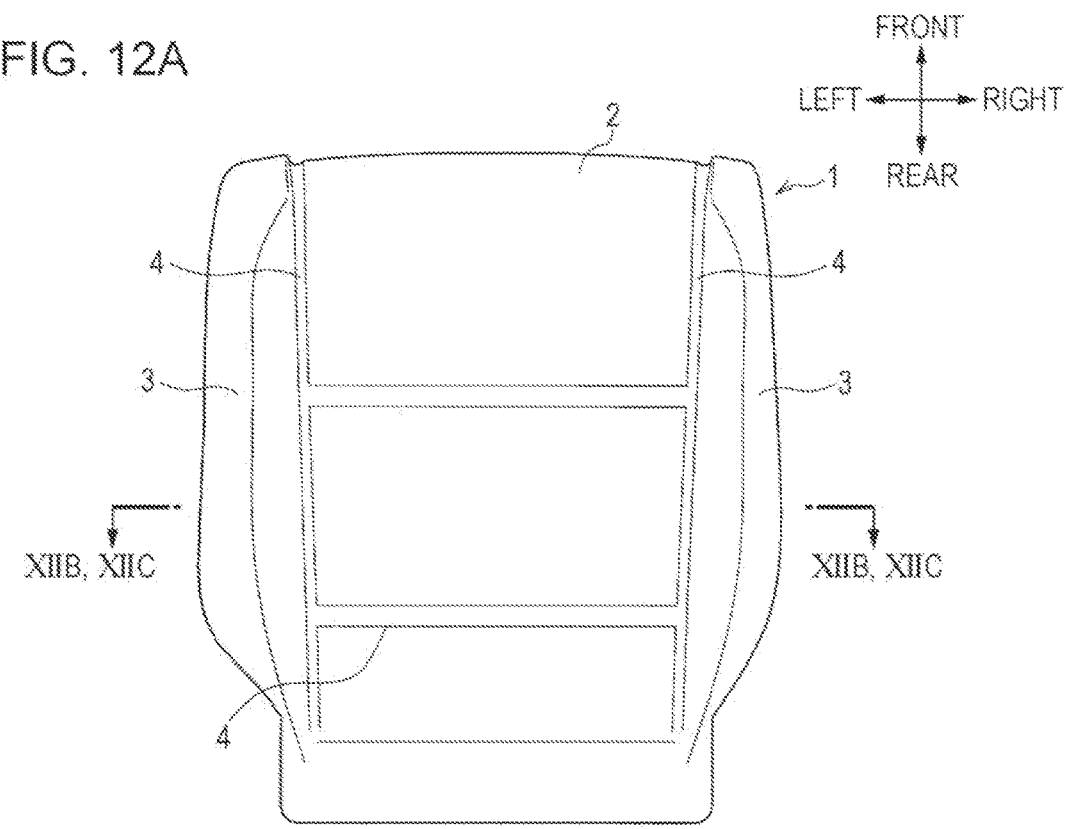
FIGS. 12A to 12C are each an explanatory diagram illustrating another example of the seat material for vehicles according to an embodiment of the present disclosure.
Figure 12B:
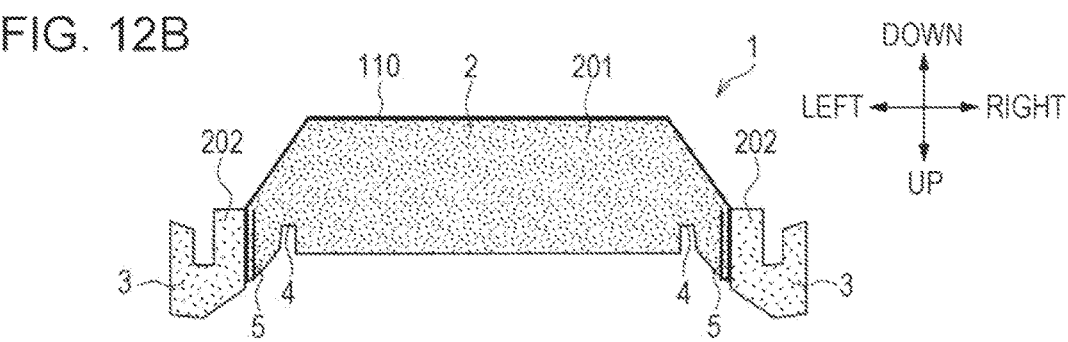
Figure 12C:
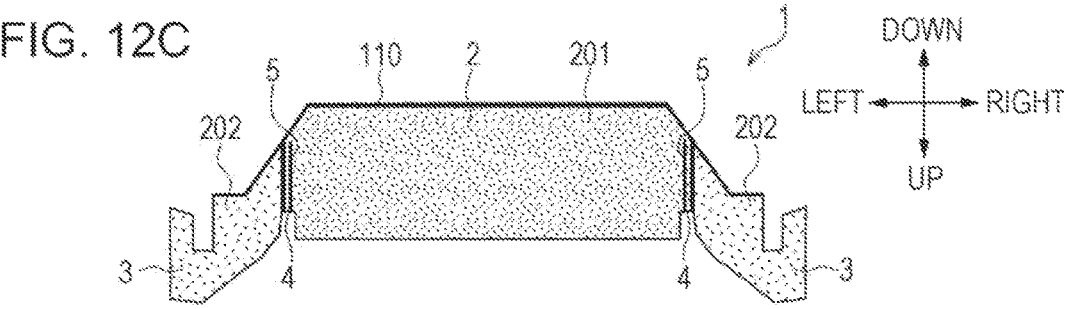

In the example described above, the seat material 1 for vehicles has been described as an example of a seat back pad that forms the seat back of a seat for vehicles. However, a seat cushion pad that forms the seat cushion of the seat for vehicles as illustrated in FIGS. 12A to 12C may also be manufactured by a similar manufacturing method. In FIGS. 12A to 12C, the same symbols as those in FIGS. 1A, 1B to 11 refer to the same components in the case of the embodiment described above, and detailed description is omitted. FIG. 12A is a plan view of the seat material 1 for vehicles, which is a seat cushion pad, and FIGS. 12B and 12C illustrate an example of a cross-sectional view taken along line XIIB-XIIB and line XIIC-XIIC of FIG. 12A. FIG. 12C illustrates an example in which the positions of the boundary portions 5 are different from those in FIG. 12B. It goes without saying that a molded article other than a seat for vehicles may also be manufactured by the same manufacturing method as in the embodiment.

The seat material 1 (molded article) for vehicles described above may be manufactured in such a manner that the main portion 2 (the first molded object) and the bank portions 3 (the second molded objects) are separated by the weirs 104 and different foam materials 201, 202 are caused to appropriately foam at respective predetermined positions. Due to the geometry of the weirs 104, the main portion 2 and the bank portions 3 may be molded so as to be mated to each other in the respective interlocking profiles 2a, 3a at the boundary portions 5 to allow mutual separation to be prevented.

According to the method of manufacturing the seat material (molded article) for vehicles of the present embodiment, it is possible to prevent the foam material 201 (first foam material) from flowing into a position at which the foam material 202 (second foam material) is supposed to foam and to prevent the foam material 202 from flowing into a position at which the foam material 201 is supposed to be foamed. The main portion 2 (the first molded object) molded with the foam material 201 and the bank portions 3 (the second molded objects) molded with the foam material 202 may be mated to each other in the respective interlocking profiles 2a, 3a at the boundary portions 5 to allow mutual separation to be prevented.

(Modification)

A modification of the above-described method of manufacturing the seat material 1 for vehicles will be described. FIGS. 13A and 13B are each an explanatory diagram illustrating a modification of the seat material 1 for vehicles described above with reference to FIGS. 1A and 1B, FIGS. 2A to 2D. FIG. 13A is a plan view of the modification, and FIG. 13B is a cross-sectional view of the modification taken along line XIIIB-XIIIB of FIG. 13A. The seat material 1 for vehicles illustrated in FIGS. 13A and 13B differs from the seat material 1 described above with reference to FIGS. 1A and 1B, FIGS. 2A to 2D in the following points.

That is, the main portion 2 of the seat material 1 (seat back pad) for vehicles is divided into an upper member (first member) 2b on the upper side of the vehicle, and a lower member (second member) 2c on the lower side of the vehicle, the lower member being molded with the foam material (urethane material) having a hardness higher than the hardness of the upper member 2b, and the members are mated to each other in the respective interlocking profiles at the boundary portions 5a, thereby achieving a structure which prevents mutual separation of the members. The structure of each boundary portion 5a is the same as the structure of the boundary portion 5 described above with reference to FIGS. 1A and 1B, FIGS. 2A to 2D. However, the width direction (the direction of an arrow 30) of the boundary portion 5a forms an acute angle with respect to the thickness direction (the direction of an arrow 31) of the upper member 2b and the lower member 2c. The width direction (the direction of the arrow 30) of the boundary portion 5a is gradually inclined to the upper side of the vehicle from the surface (front surface 32) of the main portion 2 that supports the back of a passenger to the surface (rear surface 33) on the opposite side. The hardness of the seat material 1 for vehicles at the bank portions 3, the lower member 2c, and the upper member 2b decreases in this order. The configuration of the seat material 1 for vehicles of FIGS. 13A and 13B other than what has been described is the same as that of FIGS. 1A and 1B, FIGS. 2A to 2D, and detailed description is omitted.

Such seat material 1 for vehicles of FIGS. 13A and 13B may prevent a passenger from clearly feeling the boundary portion 5a which is between the upper member 2b and the lower member 2c and has a different hardness. That is, a passenger feels that the hardness is gradually reduced (softened) from the lower member 2c to the upper member 2b in the periphery of the boundary portion 5a, and does not feel that the hardness suddenly changes at a certain position. Therefore, a passenger sitting on the seat material 1 for vehicles does not feel an uncomfortable physical feeling. In this case, the upper member 2b is made of a material softer than the lower member 2c. That is, the lower member 2c may fully support the waist of a passenger, the upper member 2b may absorb the vibration of the vehicle, and transmission of the vibration to the shoulder of a passenger may be reduced.

Also, the configuration of the seat material 1 for vehicles of FIGS. 13A and 13B may be applied to the seat cushion pad as illustrated in FIGS. 12A to 12C. In this case, the main portion 2 of the seat material 1 for vehicles is divided into a front member (first member) on the front side of the vehicle, and a rear member (second member) on the rear side of the vehicle, the rear member being molded with the foam material (urethane material) having a hardness after foaming higher than the hardness of the front member. The boundary portion (same as the boundary portion 5a) has a structure which allows both members to be mated to each other in the respective interlocking profiles and prevents mutual separation of the members. Furthermore, the width direction of the boundary portion forms an acute angle with respect to the thickness direction of the front member and the rear member. The width direction of the boundary portion is gradually inclined to the forward side of the vehicle from the surface (upper surface) of the main portion 2 that supports the buttocks of a passenger to the surface (lower surface) on the opposite side. The hardness of the seat material 1 for vehicles is the highest at the bank portions 3, and is reduced at the rear member and the front member sequentially. Also in this case, a passenger feels that the hardness is gradually reduced from the rear member to the front member in the periphery of the boundary portion, and does not feel that the hardness suddenly changes at a certain position. Therefore, a passenger sitting on the seat material 1 for vehicles does not feel an uncomfortable physical feeling.

The method of manufacturing the seat material 1 for vehicles described above with reference to FIGS. 3 to 6 may be used as a method of manufacturing the seat material 1 for vehicles such as illustrated in FIGS. 13A and 13B. In this case, a weir (with the same configuration as in the weir 104) for molding the boundary portion 5a is attached within the cavity 103. Because the width direction of the boundary portion 5a is inclined as described above, the weir for molding the boundary portion 5a is also inclined according to the inclination of the boundary portion 5a and attached within the cavity 103. In this case, the weir may also have the configuration described above with reference to FIG. 11 so that the weir for molding the boundary portion 5a is easily demolded.

It goes without saying that the present disclosure is not limited to the present embodiment. For example, in the present embodiment, an example has been described, in which foam materials having different hardness levels are used as mutually different foam materials in the present disclosure. However, foam materials having different densities or vibration absorption characteristics may be used. In the example of FIGS. 13A and 13B, the boundary portion 5a is inclined so as to be gradually higher as the boundary portion 5a is closer to the rear surface 33 away from the front surface 32. However, the boundary portion 5a may be inclined so as to be gradually lower as the boundary portion 5a is closer to the rear surface 33 away from the front surface 32. Similarly, also in the case where the seat material 1 for vehicles is applied to a seat cushion pad, the boundary portion is inclined so as to be gradually rearward as the boundary portion is closer to the lower surface away from the upper surface. However, the boundary portion may be inclined so as to be gradually forward as the boundary portion is closer to the rear surface away from the front surface. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A molded body comprising:
   a first molded object molded with a first foam material; and
   a second molded object molded with a second foam material different from the first foam material,
   wherein the first molded object and the second molded object each include an interlocking profile and the first molded object and the second molded object are interlocked to each other by means of respective interlocking profiles at a boundary portion between the first and second molded objects to prevent mutual separation of the first and second molded objects, and
   wherein the first molded object includes an upright portion oriented upright and divided into a first member on an upper side thereof and a second member on a lower side thereof, the second member being positioned under the first member, the second member being molded with a foam material different from the first foam material, and the first and second members each include an interlocking profile and the first and second members are interlocked to each other by means of the respective interlocking profiles at a second boundary portion between the first and second members to prevent mutual separation of the members,
   wherein the second boundary portion between the first and second members entirely linearly extends such that an extending direction of the second boundary portion obliquely intersects a thickness direction of the first member and the second member to form an acute angle with respect to the thickness direction of the first member and the second member.

2. A seat material for vehicles, comprising:
   a main portion molded with a first foam material; and
   a bank portion provided on each of both sides of the main portion and molded with a second foam material different from the first foam material,
   wherein the main portion and the bank portion each include an interlocking profile and the main portion and the bank portion are interlocked to each other by means of respective interlocking profiles at a boundary portion between the main and bank portions to prevent mutual separation of the main and bank portions, and
   wherein the main portion includes an upright seat back portion oriented upright and divided into a first member on an upper side of a vehicle and a second member on a lower side of the vehicle, the second member being positioned under the first member, the second member being molded with a foam material different from the first foam material, and the first and second members each include an interlocking profile and the first and second members are interlocked to each other by means of the respective interlocking profiles at a second boundary portion between the first and second members to prevent mutual separation of the members,
   wherein the second boundary portion between the first and second members entirely linearly extends such that an extending direction of the second boundary portion obliquely intersects a thickness direction of the first member and the second member to form an acute angle with respect to the thickness direction of the first member and the second member.

3. The seat material for vehicles according to claim 2,
   wherein the second member is molded with the foam material having a hardness after foaming higher than a hardness of the first member.

4. The seat material for vehicles according to claim 2,
   wherein each of the interlocking profiles includes a bulbous projection.

5. The seat material for vehicles according to claim 2,
   wherein each of the interlocking profiles includes a dovetail projection.

* * * * *